L. CHEVROLET.
STEERING WHEEL.
APPLICATION FILED NOV. 8, 1916.
1,238,262.
Patented Aug. 28, 1917.
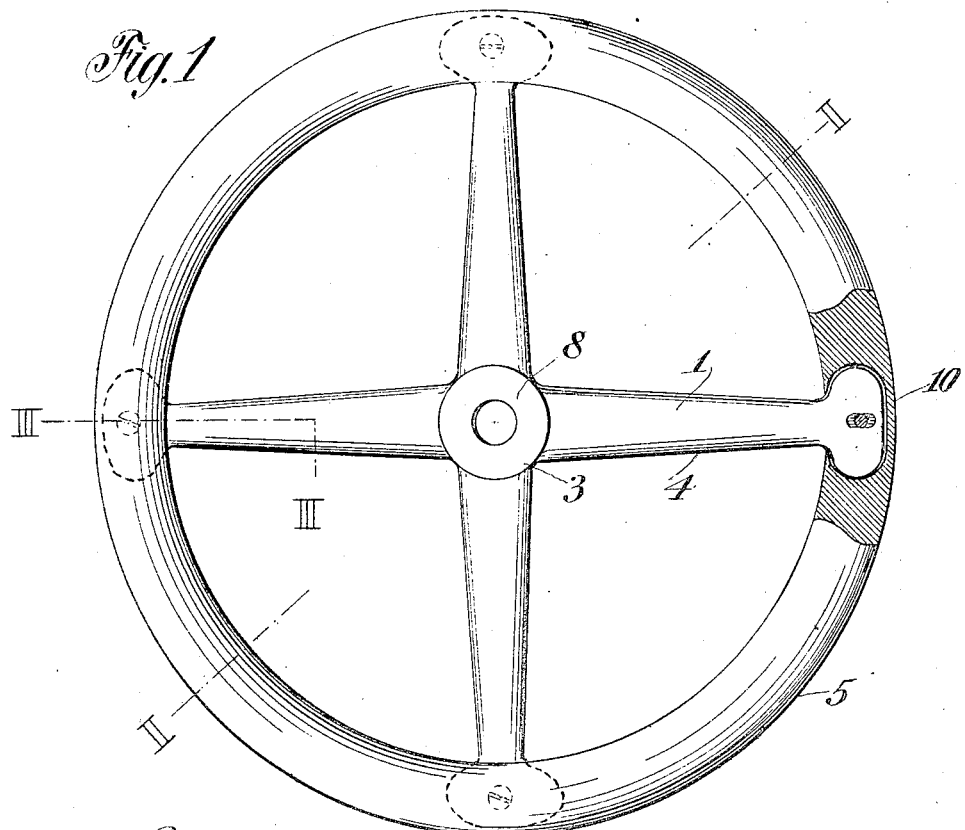
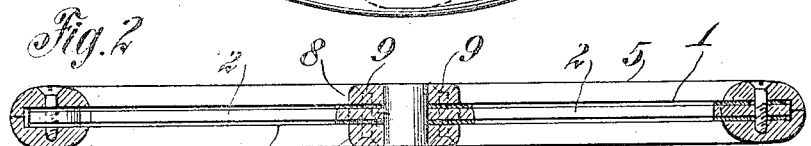
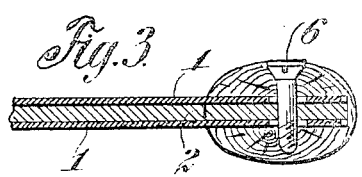
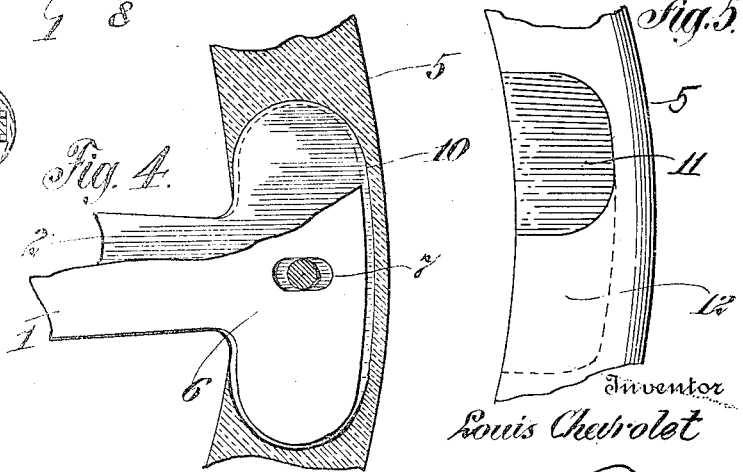
Inventor
Louis Chevrolet
Witness
Charles Balg
Chas. W. Stauffiger
By
Attorneys

UNITED STATES PATENT OFFICE.

LOUIS CHEVROLET, OF DETROIT, MICHIGAN.

STEERING-WHEEL.

1,238,262.   Specification of Letters Patent.   Patented Aug. 28, 1917.

Application filed November 8, 1916. Serial No. 130,290.

*To all whom it may concern:*

Be it known that I, Louis Chevrolet, a citizen of the United States of America, residing at Detroit, in the county of Wayne and State of Michigan, have invented certain new and useful Improvements in Steering-Wheels, of which the following is a specification, reference being had therein to the accompanying drawings.

The object of this invention and the embodiment of same, are herein set forth with sufficient clearness to enable those skilled in the arts of motor vehicle construction and operation to make and use the same.

The object of this invention is to provide a resilient hand wheel for the steering mechanism of a motor vehicle which shall have a resiliency in a line parallel with the axis of the shaft upon which the wheel is mounted but which shall be rigid in a rotative movement, so that the accuracy and efficiency of the steering function of the wheel shall not be in any way impaired, and at the same time providing a great amount of comfort to the driver through elimination of vibrations of the steering wheel.

I am aware that resilient wheels have heretofore been constructed, but so far as I am aware, all of such wheels employ a construction which adapts them to have a degree of lateral resiliency as well as a vertical resiliency. Said latter resiliency or rotative movement is necessarily such that there is a certain degree of lost motion to the steering actuation of the wheel, and this is objectionable.

The construction which I employ is clearly shown in the accompanying drawings the various figures of which are as follows:—

Figure 1 is a plan view of the wheel;

Fig. 2 is a section on line II—II of Fig. 1;

Fig. 3 is a section on line III—III of Fig. 1;

Fig. 4 is an enlarged detail illustrating the method of attaching the arms or spokes to the rim of the wheel;

Fig. 5 is a view illustrating another method of attaching the arms to the wheel rim.

The construction here illustrated is substantially as follows:—

I provide a central structure for the wheel consisting of a spider composed of several members 1 and 2 each of which preferably is a unitary structure comprising a central hub 3 and the arms 4 each of said arms being formed at the end thereof into a laterally extending plate to increase the area of same where it is in contact, or forms its connection with the rim 5 of the wheel. As shown in the drawings the two outer spiders 1, 1 are identical in construction and are considerably thinner than the intermediate spider 2; this may or may not be so, since it is possible to construct all of said spiders of the same thickness of metal; they are all however composed of a flexible metal so that they will have a resilient action substantially in line with the shaft of the wheel.

The end of each arm of the intermediate spider is provided with a reamed hole for the passage therethrough of the screw or pin 6 which also passes through said rim 5. Each of the outer spiders 1 is provided with a radial slot 7 through which said screw passes, said slot being for the purpose of providing for the slight amount of play which is due to the resiliency of the members.

The central portion of the spider is provided with a suitable hub consisting of the bosses 8, 8 which may be secured in position in any suitable manner as by the rivets 9, 9.

Said rim structure 5 is provided with pockets 10 for the reception of the outer ends of said arms into which a portion (1, 1) of said arms pass freely and may have a certain amount of play therein. Another method of assembling is shown in Fig. 5 in which the ends of the arms are dropped into recesses 11 and then moved laterally into slots 12 after which the recesses are plugged up.

While I have shown and described a wheel having a spider composed of three resilient members, it is obvious that any number may be used.

What I claim is:—

1. A steering wheel for motor vehicles, comprising a hub, a rim, and a spider comprising a plurality of thin flexible arm members certain of which members rigidly connect the hub and rim to prevent lateral movement of the rim relative to the hub with the other arm members free to move longitudinally relative thereto upon flexure of all of the members in a direction substantially parallel to the axis of the wheel.

2. A steering wheel for motor vehicles consisting of the combination of a rim member and an arm member, said arm member being composed of a plurality of spiders each of which is a unitary element composed of thin flexible metal, one of said spiders being adapted to be rigidly attached at the outer end of each of its arms to said rim, the remainder of said spiders being adapted to be yieldably attached at the outer end of each of its arms to said rim and means adapted to so attach said arms to said rim.

3. A steering wheel for motor vehicles consisting of the combination of a rim structure and an arm structure, whereby said arm structure is adapted to absorb vibrations communicated thereto in a line substantially parallel with the axis of said wheel, said arm structure being composed of a plurality of spiders, each of which is a unitary element composed of thin flexible material, the outer ends of said arms extending freely into the body of said rim, there being a hole in one of said arms for the reception of a pin which fills said hole closely, also radially disposed slots through the remainder of said arms for the reception of said pin and a pin passing through the body of said rim, said hole and said slots.

4. A steering wheel for motor vehicles consisting of the combination of a rim structure and an arm structure, said rim structure consisting of a circular body having inwardly-disposed pockets adapted for the reception of the outer ends of the arms of said arm structure, said arm structure being composed of a plurality of spiders each of which is formed from flexible metal and having a plurality of arms arranged to coincide in position with the arms of each of the other spiders, and being superimposed one upon the other, one of said spiders having a hole through the outer end of the arms of said spider, radially disposed slots through the outer ends of each of the other arms of said spiders, the outer ends of said arms being disposed within said pockets, and pins passing through said rim, holes and slots.

5. A steering wheel for motor vehicles consisting of the combination of a rim structure and an arm structure, said rim structure consisting of a circular body having inwardly-disposed pockets for the reception of the outer ends of the arms of said arm structure, said arm structure being composed of a plurality of spiders each of which is a unitary element having a plurality of arms arranged to coincide in position with the arms of each of said other spiders, said spiders being superimposed one upon the other, the intermediate one of said spiders being of greater resistance than the others, said arms being adapted at their outer ends to occupy said pockets of said rim structure, there being a hole through the outer end of said intermediate arms for the passage of a pin, also radially disposed slots in said other arms for the passage of said pin, and a pin of suitable size to fit said hole closely passing through said rim, said hole and said slots.

6. A steering wheel for motor vehicles, comprising a hub, a rim, and an arm structure connecting the hub and rim and having arms, each of which arms comprises a plurality of superposed thin flexible members one of which members of each arm is rigidly connected at its ends to both the hub and rim and another of which members of each arm is rigidly connected at one end only.

In testimony whereof I affix my signature in the presence of two witnesses.

LOUIS CHEVROLET.

Witnesses:
ANNA M. DORR,
LEWIS E. SANDERS.